United States Patent
Chen et al.

(10) Patent No.: US 9,563,781 B2
(45) Date of Patent: Feb. 7, 2017

(54) DIRECTIONAL OPTIMIZATION FOR POLICY EVALUATION

(75) Inventors: Xiangfu Chen, Acton, MA (US); John G. de Freitas, Arlington, MA (US); Shiu F. Poon, Cambridge, MA (US); Richard E. Salz, Reading, MA (US)

(73) Assignee: International Business Machines Corporation, Armonk, NY (US)

( * ) Notice: Subject to any disclaimer, the term of this patent is extended or adjusted under 35 U.S.C. 154(b) by 424 days.

(21) Appl. No.: 12/262,900

(22) Filed: Oct. 31, 2008

(65) Prior Publication Data

US 2010/0115075 A1    May 6, 2010

(51) Int. Cl.
  *G06F 15/16*    (2006.01)
  *G06F 21/62*    (2013.01)

(52) U.S. Cl.
  CPC ..................................... *G06F 21/62* (2013.01)

(58) Field of Classification Search
  CPC .. H04L 63/0227; H04L 47/2441; H04L 69/22; H04L 12/1485
  USPC ......................................... 709/223, 226, 227
  See application file for complete search history.

(56) References Cited

U.S. PATENT DOCUMENTS

| | | | |
|---|---|---|---|
| 6,888,821 B2 * | 5/2005 | Rasanen et al. | 370/352 |
| 2005/0108775 A1 * | 5/2005 | Bachar et al. | 725/135 |
| 2006/0072456 A1 * | 4/2006 | Chari et al. | 370/230 |
| 2007/0282951 A1 * | 12/2007 | Selimis et al. | 709/205 |
| 2008/0228860 A1 * | 9/2008 | Angelov | 709/202 |
| 2008/0263148 A1 * | 10/2008 | Mace et al. | 709/203 |
| 2008/0281920 A1 * | 11/2008 | Rosu | 709/206 |
| 2009/0300341 A1 * | 12/2009 | Buehler et al. | 713/1 |

* cited by examiner

*Primary Examiner* — Djenane Bayard
(74) *Attorney, Agent, or Firm* — Steven M. Greenberg, Esq.; CRGO Law

(57) ABSTRACT

Embodiments of the present invention provide a method, system and computer program product for directional optimization of policy statements for a Web service. In an embodiment of the invention, a method for directional optimization of policy statements in a policy document can be provided. The method can include loading a policy document referenced for a Web service, extracting a policy from the policy document, and determining whether the extracted policy is bi-directional or direction agnostic. A single run time presentation for the extracted policy can be created when the extracted policy is direction agnostic. Otherwise, separate run time presentations can be created for each direction of the extracted policy when the extracted policy is bi-directional.

11 Claims, 2 Drawing Sheets

DIRECTIONAL OPTIMIZATION FOR POLICY EVALUATION

BACKGROUND OF THE INVENTION

Field of the Invention

The present invention relates to the field of Web services and more particularly to policy processing in a policy document.

Description of the Related Art

The achievement of universal interoperability between applications by using Web standards remains the principal goal of Web Services. Web Services use a loosely coupled integration model to allow flexible integration of heterogeneous systems in a variety of domains including business-to-consumer, business-to-business and enterprise application integration. The following basic specifications originally defined the Web Services space: the Simple Object Access Protocol (SOAP), the Web Services Description Language (WSDL), and Universal Description, Discovery, and Integration (UDDI). SOAP defines an XML messaging protocol for basic service interoperability. WSDL introduces a common grammar for describing services. UDDI provides the infrastructure required to publish and discover services in a systematic way. Together, these specifications allow applications to find each other and interact following a loosely coupled, platform-independent model.

Presently, the interaction model that is directly supported by WSDL essentially can be viewed as a stateless model of synchronous or uncorrelated asynchronous interactions. Models for business interactions typically assume sequences of peer-to-peer message exchanges, both synchronous and asynchronous, within stateful, long-running interactions involving two or more parties. Nevertheless, systems integration requires more than the mere ability to conduct simple interactions by using standard protocols. The full potential of Web Services as an integration platform will be achieved only when applications and business processes are able to integrate their complex interactions by using a standard process integration model.

WS-Policy is a specification that allows Web services to use XML to advertise the message exchange policies of the Web service, such as relates to security, and Quality of Service, for Web service consumers to specify policy requirements. WS-Policy represents a set of specifications that describe the capabilities and constraints of the security (and other business) policies on intermediaries and endpoints. Examples include required security tokens, supported encryption algorithms, and privacy rules, to name a few. WS-Policy further specifies how to associate policies with services and endpoints.

A policy according to WS-Policy can be attached at different portions of the WSDL structure so that the policy domain is left to define the combining rules when different policies of the same domain appear within the same branch of a WSDL tree. Because a WSDL message part can be used in a particular message exchange—whether request or response—a policy statement inherently can be bi-directional. In particular, new messaging specifications, such as WS-Addressing, supply endpoint references to a WSDL document. The inclusion of policy statements in different endpoint references have resulted and those policy statements are inherently bi-directional. Accordingly, the management process undertaken in response to a particular policy can vary depending upon the direction of a message, e.g. whether the message is a request or a response.

BRIEF SUMMARY OF THE INVENTION

Embodiments of the present invention address deficiencies of the art in respect to policy processing for a Web service and provide a novel and non-obvious method, system and computer program product for directional optimization of policy statements for a Web service. In an embodiment of the invention, a method for directional optimization of policy statements in a policy document can be provided. The method can include loading a policy document referenced for a Web service, extracting a policy from the policy document, and determining whether the extracted policy is bi-directional or direction agnostic. A single run time presentation for the extracted policy can be created when the extracted policy is direction agnostic. Otherwise, separate run time presentations can be created for each direction of the extracted policy when the extracted policy is bi-directional.

In another embodiment of the invention, a policy document data processing system can be configured for directional optimization of policy statements in a policy document. The system can include a Web services server executing in a host computing platform and managing messaging exchanges for a Web service according to different runtime presentations of security policies for the Web service. The system also can include policy evaluation logic coupled to the Web services server. The logic can include program code enabled to parse a policy document for the Web service to extract one or more different policies, to identify ones of the extracted policies that are bi-directional, and to create separate direction-aware runtime presentations of each of the identified ones of the extracted policies that are bi-directional. In one aspect of the embodiment, the Web service can be described by a WSDL conformant document and the policy document can be referenced in the WSDL conformant document and further can conform to WS-Policy.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the present invention provide a method, system and computer program product for directional optimization of policy statements in a policy document. In accordance with an embodiment of the present invention, a policy document for message exchanges referenced in a WSDL document for a Web service can be retrieved and parsed to extract one or more different policies. Extracted policies that are bi-directional can be identified and separate direction-aware runtime presentation of each of the identified policies can be created. For each extracted policy that is not bi-directional and hence directionally agnostic, a direction agnostic runtime presentation of the directionally agnostic policy can be created. Thereafter, resulting messaging exchanges for the Web service can be managed according to the different runtime presentations of the extracted policies.

Figure 1:
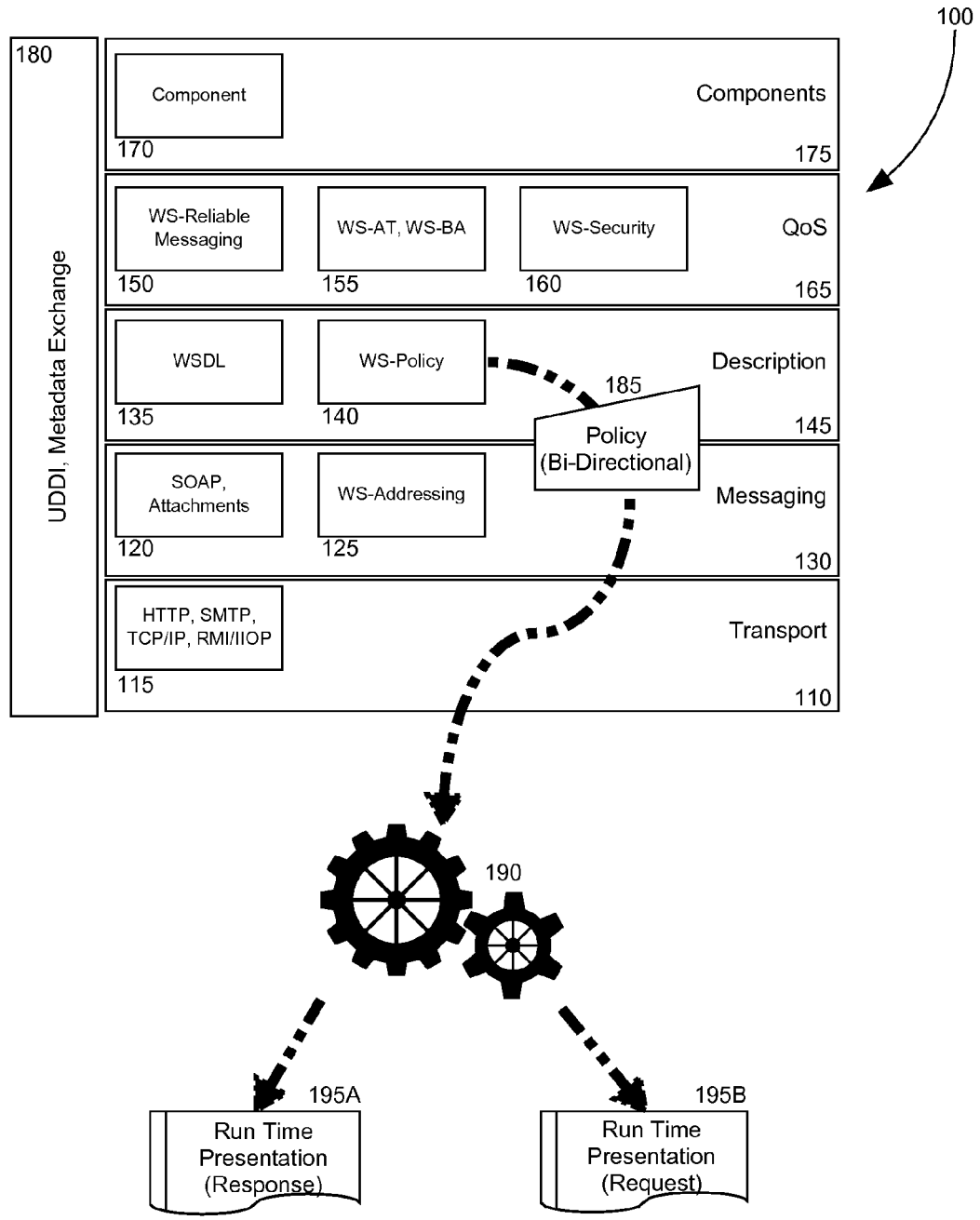
FIG. 1 is a pictorial illustration of a process for directional optimization of policy statements in a policy document.

In further illustration, FIG. 1 is a pictorial illustration of a process for directional optimization of policy statements in a WSDL document. As shown in FIG. 1, a Web services application stack 100 of a Web service can include each of a transport layer 110, a messaging layer 130, a description layer 145, a quality of service layer 165 and a components layer 175. The components layer 175 can include one or more different logical components 170 providing executable program logic for the Web service. The quality of service layer 165 can include each of a WS-Reliable Messaging document 150 specifying terms of message delivery reliability for the Web service, a WS-AT or WS-BA document 155 specifying term of managing transactions between distributed applications, transaction managers and resource managers for the Web service, and a WS-Security document 160 specifying terms for applying security to the Web service.

The description layer 145 can include both a WSDL document 135 and a WS-Policy document 140. The WSDL document 135 can describe an interface to the Web service including available operations, while the WS-Policy document 140 can specify security policies requisite for message exchanges with the Web service described by the WSDL document 135. The messaging layer 130 in turn can include both SOAP attachments 120 and WS-addressing data 125. Finally, the transport layer 110 can include supported transport mechanisms, such as HTTP, SMTP, TCP/IP or RMI/IIOP. Of note, a discovery layer 180 also can be provided through which the Web service can be discovered by way of a directory protocol such as UDDI.

Importantly, different policies 185 can be specified within the WS-Policy document 140 and extracted to determine whether each of the extracted policies is direction agnostic or bi-directional in nature. For example, the WS-Policy document 140 can be referenced or a serialization of the run-time presentation can be inserted within an endpoint reference such as those specified by the WS-Addressing specification. A WSDL document data processing system 190 configured for directional optimization of policy statements in a WSDL document can examine each extracted policy 185 and in the latter circumstance, a run time presentation for the response direction 195A can be created for the extracted policy 185 as well as a run time presentation for the request direction 195B be created for a response for the extracted policy 185. In this way, specific programmatic operations necessary only for one of the directions—whether request or response—can be placed in the appropriate run time presentation of the extracted policy 185.

Figure 2:
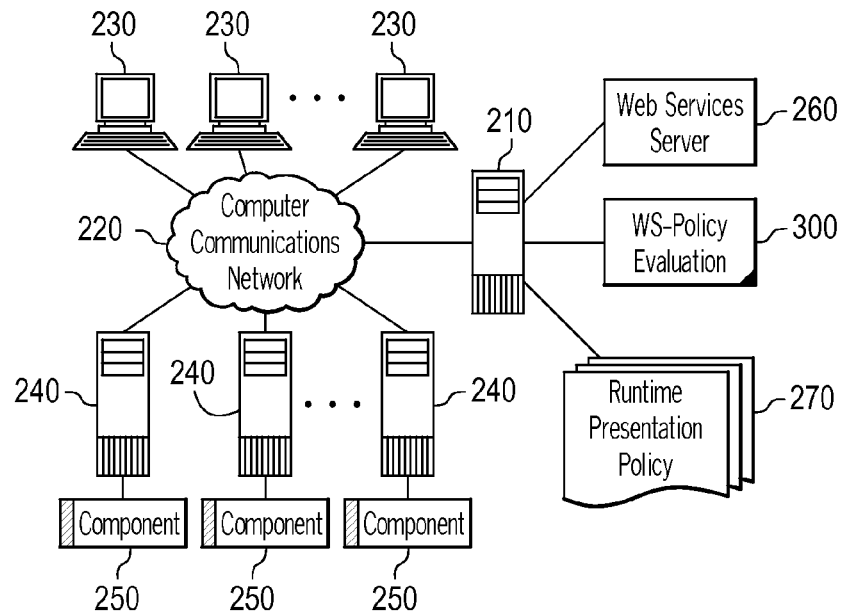
FIG. 2 is a policy document data processing system configured for directional optimization of policy statements in a policy document; and, FIG. 3 is a flow chart illustrating a process for directional optimization of policy statements in a policy document.

In further illustration, FIG. 2 is a WSDL document data processing system configured for directional optimization of policy statements in a WSDL document. The system can include a host computing platform 210 communicatively coupled over computer communications network 220 to different clients 230 and also different servers 240, each hosting the execution of one or more components 250 of one or more Web services. The host computing platform 210 can include one or more servers acting in concert so as to provide access the Web services through Web services server 260 limited by security policies set forth in respective WS-Policy documents and implemented according to run time presentation policies corresponding to the policies of the WS-Policy documents.

Notably, the host computing platform 210 can support the operation of WS-Policy evaluation logic 300. The WS-Policy evaluation logic 300 can include program code enabled to parse a WS-Policy document for a Web service to extract one or more different policies. Extracted policies that are bi-directional can be identified and separate direction-aware runtime presentation of each of the identified policies can be created. For each extracted policy that is not bi-directional and hence directionally agnostic, a direction agnostic runtime presentation of the directionally agnostic policy can be created. Thereafter, resulting messaging exchanges for the Web service can be managed according to the different runtime presentations of the extracted policies.

Figure 3:
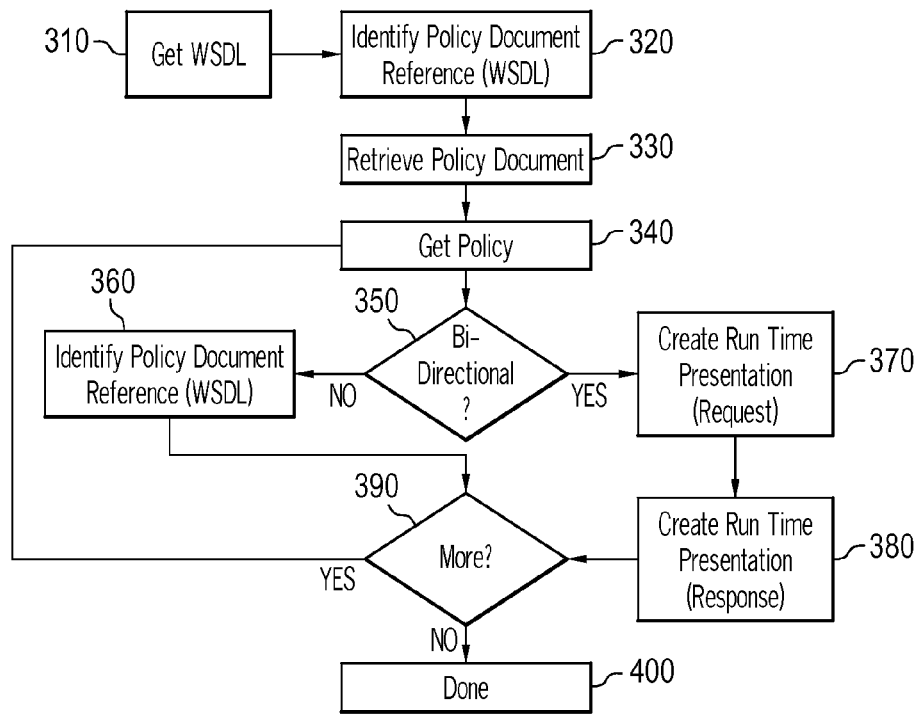

In yet further illustration of the operation of the WS-Policy evaluation logic 300, FIG. 3 is a flow chart illustrating a process for directional optimization of policy statements in a WSDL document. Beginning in block 310, a WSDL document can be retrieved for a Web service. In block 320, a policy document reference, such as a reference to a WS-Policy conformant document, can be identified within the WSDL document including from within an endpoint reference, and in block 330, the identified policy document can be retrieved. In block 340, a policy can be extracted from the policy document and in decision block 350 it can be determined whether the extracted policy is bi-directional or direction agnostic.

In block 360 if the extracted policy is determined to be direction agnostic, a single run time presentation can be created for the extracted policy. Otherwise, in block 370 a first run time presentation can be created specific to the request direction and in block 380 a second run time presentation can be created specific to the response direction. Thereafter, in decision block 390 it can be determined whether additional policies remain to be processed in the policy document. If so, the process can return to block 340. Otherwise, the process can end in block 400.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable storage medium can be any apparatus that can contain or store the program for use by or in connection with the instruction execution system, apparatus, or device. The storage medium can be an electronic, magnetic, optical, electromagnetic, infrared, or semiconductor storage system (or apparatus or device). Examples of a computer-readable storage or computer-usable storage medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

We claim:

1. A method for directional optimization of policy statements in a policy document, the method comprising:
    loading in a document data processing system executing in memory of a host computing platform a policy document referenced for a Web service;
    extracting a policy from the policy document;
    determining whether the extracted policy is bi-directional or direction agnostic without specifying a particular direction or multiple directions; and,
    creating a single run time presentation for the extracted policy when the extracted policy is direction agnostic, or creating separate run time presentations for each direction of the extracted policy when the extracted policy is bi-directional.

2. The method of claim 1, wherein loading a policy document referenced for a Web service, comprises loading a WS-Policy conformant policy document referenced in a Web services definition language (WSDL) document for a Web service.

3. The method of claim 1, wherein loading a policy document referenced for a Web service, comprises loading a WS-Policy conformant policy document referenced in an endpoint reference for a Web service.

4. The method of claim 1, further comprising repeating the extracting, determining and creating steps for each policy in the policy document.

5. A policy document data processing system configured for directional optimization of policy statements in a policy document, the system comprising:
    a host computing system comprising memory and at least one processor;
    a Web services server executing in the memory by the at least one processor of the host computing system and managing messaging exchanges for a Web service according to different runtime presentations of security policies for the Web service; and,
    policy evaluation logic coupled to the Web services server, the logic comprising program code enabled to parse a policy document for the Web service to extract one or more different policies, to identify ones of the extracted policies that are bi-directional and others that are direction agnostic without specifying a particular direction or multiple directions, and to create separate direction-aware runtime presentations of each of the identified ones of the extracted policies that are bi-directional but to create a single run time presentation for each of the identified ones of the extracted policies that are direction agnostic.

6. The system of claim 5, wherein the Web service is described by a Web services definition language (WSDL) conformant document and wherein the policy document is referenced in the WSDL conformant document and further conforms to WS-Policy.

7. The system of claim 5, wherein the Web service is described by a Web services definition language (WSDL) conformant document and wherein the policy document is referenced in an endpoint reference to the Web service and further conforms to WS-Policy.

8. A computer program product comprising a non-transitory computer usable storage medium embodying computer usable program code for directional optimization of policy statements in a policy document, the computer program product comprising:
    computer usable program code for loading a policy document referenced for a Web service;
    computer usable program code for extracting a policy from the policy document;
    computer usable program code for determining whether the extracted policy is bi-directional or direction agnostic without specifying a particular direction or multiple directions; and,
    computer usable program code for creating a single run time presentation for the extracted policy when the extracted policy is direction agnostic, or creating separate run time presentations for each direction of the extracted policy when the extracted policy is bi-directional.

9. The computer program product of claim 8, wherein the computer usable program code for loading a policy document referenced for a Web service, comprises computer usable program code for loading a WS-Policy conformant policy document referenced in a Web services definition language (WSDL) document for a Web service.

10. The computer program product of claim 8, wherein the computer usable program code for loading a policy document referenced for a Web service, comprises computer usable program code for loading a WS-Policy conformant policy document referenced in an endpoint reference for a Web service.

11. The computer program product of claim 8, further comprising computer usable program code for repeating the extracting, determining and creating steps for each policy in the policy document.

* * * * *